March 25, 1958  J. J. HARRINGTON ET AL  2,828,030
ELEVATOR FOR USE WITH TOBACCO HARVESTER
Filed Feb. 7, 1955  4 Sheets-Sheet 1
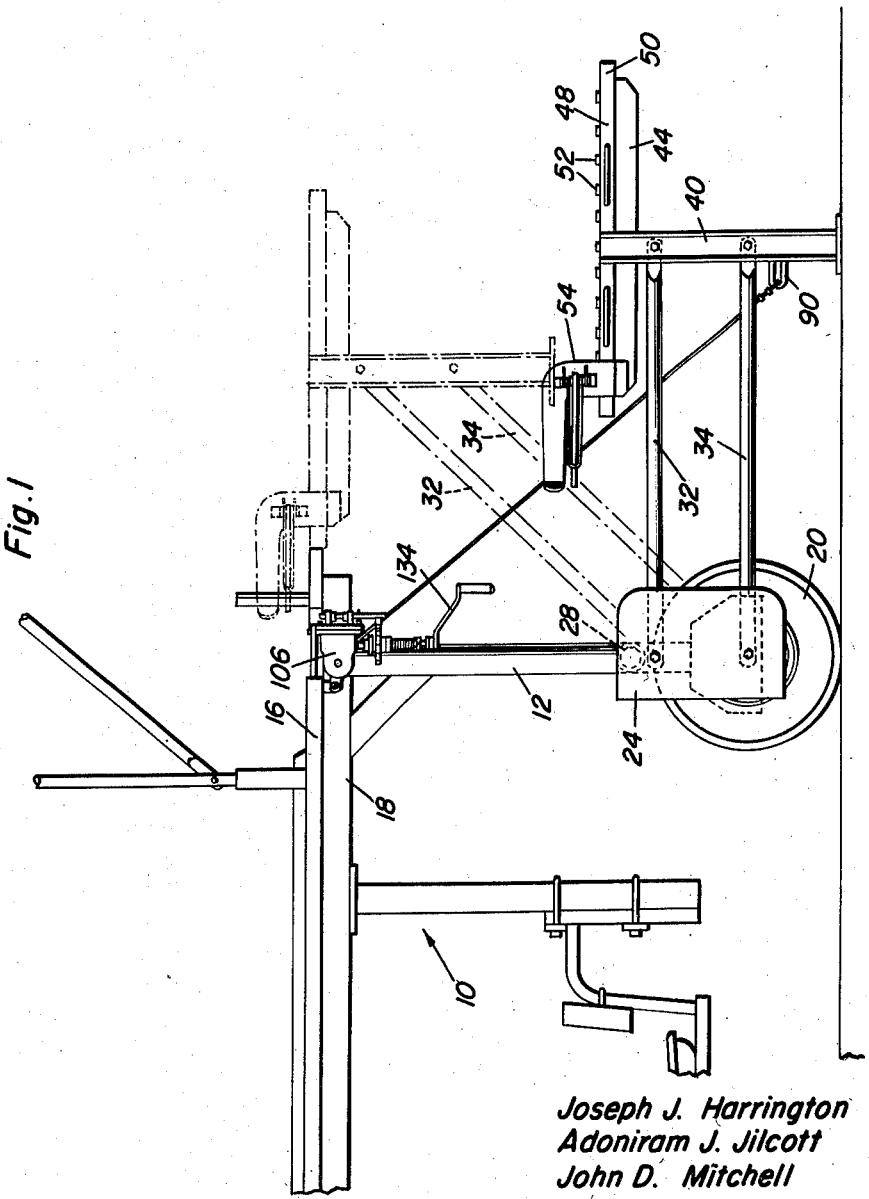
Joseph J. Harrington
Adoniram J. Jilcott
John D. Mitchell
Bertram L. Jordan
Charles B. Stansfield
INVENTORS.
BY
Attorneys March 25, 1958   J. J. HARRINGTON ET AL   2,828,030
ELEVATOR FOR USE WITH TOBACCO HARVESTER
Filed Feb. 7, 1955   4 Sheets-Sheet 2
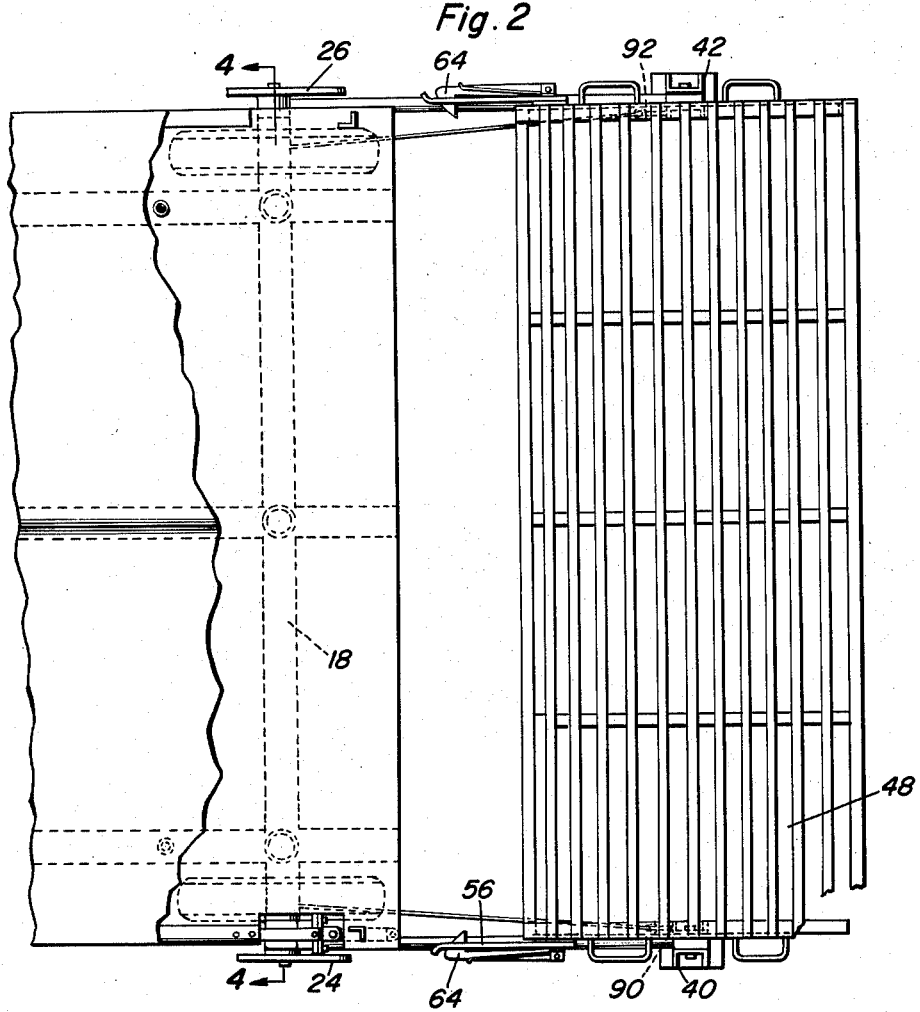
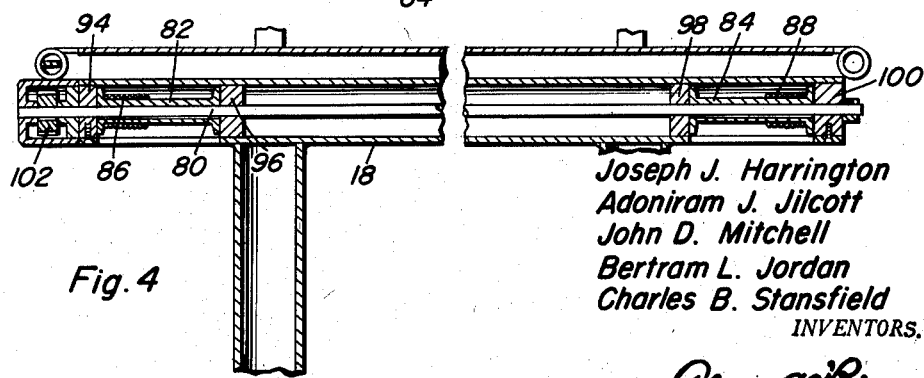
Joseph J. Harrington
Adoniram J. Jilcott
John D. Mitchell
Bertram L. Jordan
Charles B. Stansfield
INVENTORS.
BY
Attorneys March 25, 1958    J. J. HARRINGTON ET AL    2,828,030
ELEVATOR FOR USE WITH TOBACCO HARVESTER
Filed Feb. 7, 1955      4 Sheets-Sheet 3
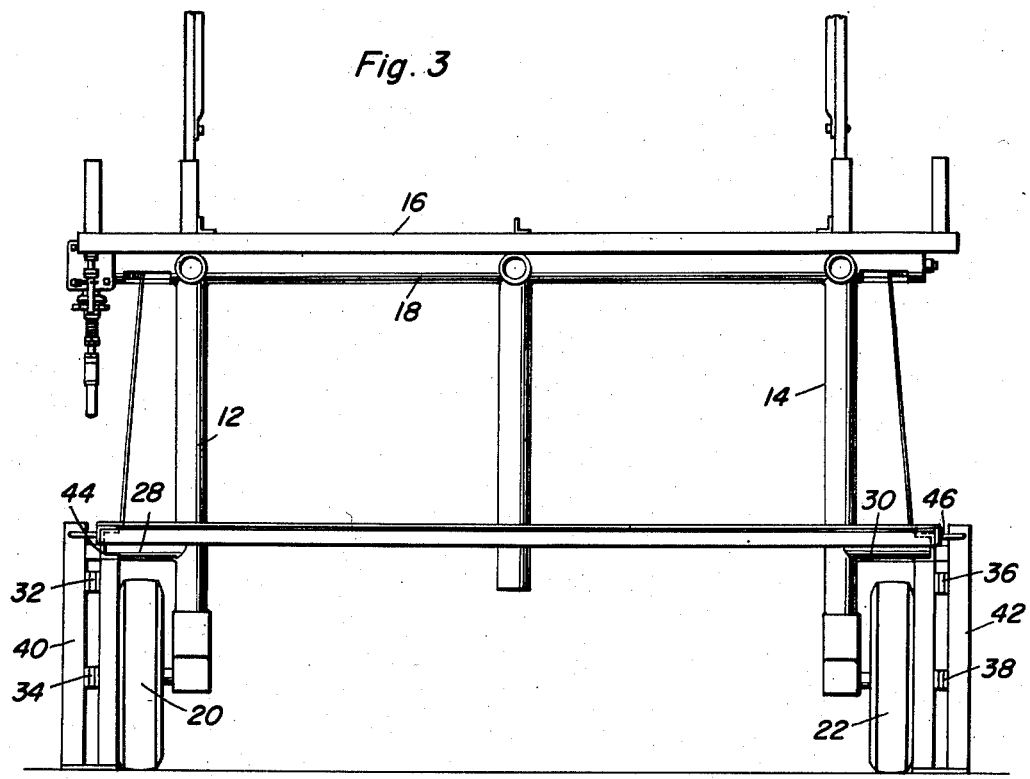
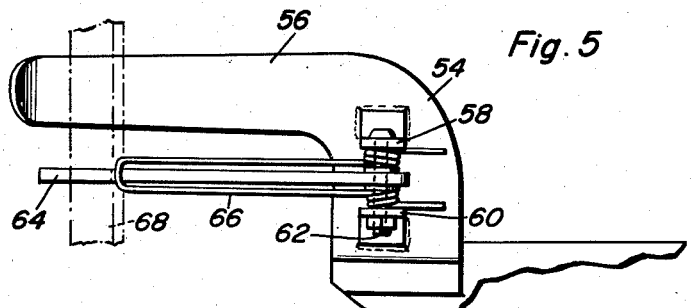
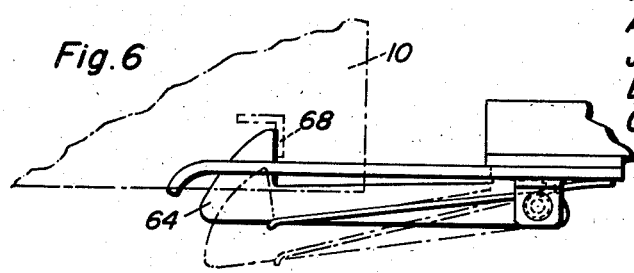
Joseph J. Harrington
Adoniram J. Jilcott
John D. Mitchell
Bertram L. Jordan
Charles B. Stansfield
            INVENTORS.

March 25, 1958  J. J. HARRINGTON ET AL  2,828,030
ELEVATOR FOR USE WITH TOBACCO HARVESTER
Filed Feb. 7, 1955  4 Sheets-Sheet 4
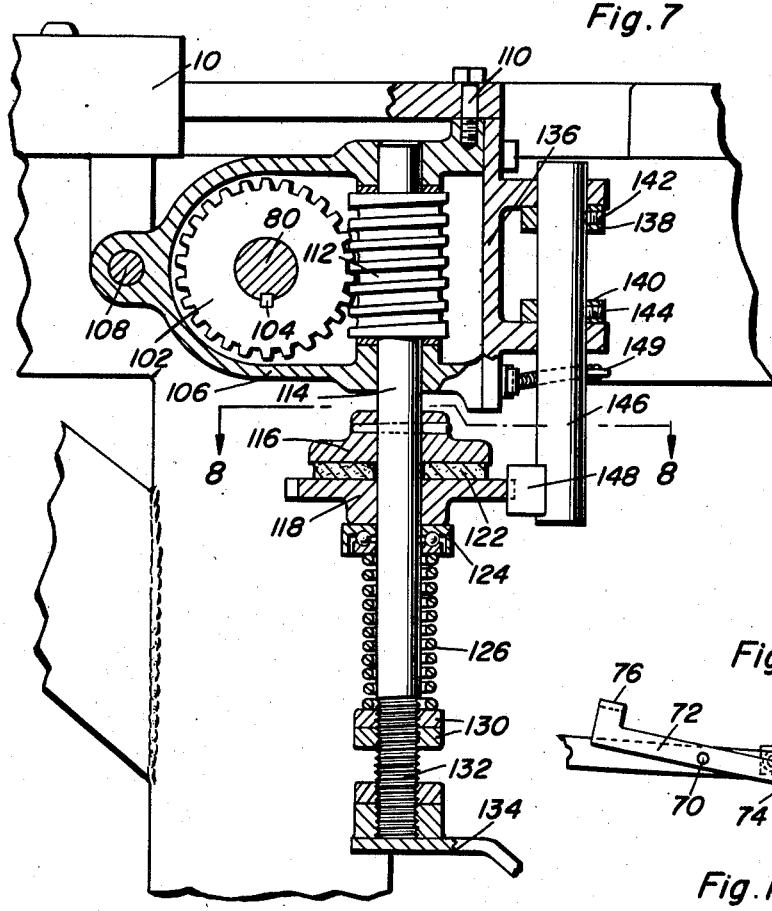
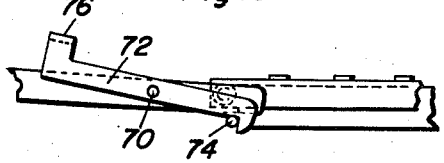
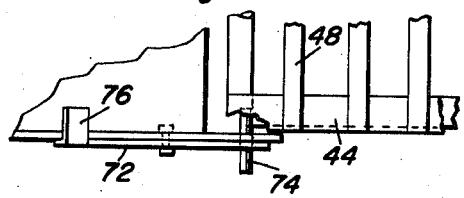
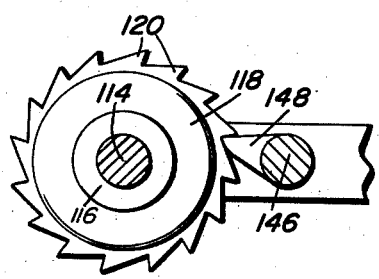
Joseph J. Harrington
Adoniram J. Jilcott
John D. Mitchell
Bertram L. Jordan
Charles B. Stansfield
                INVENTORS.

United States Patent Office 2,828,030
Patented Mar. 25, 1958

2,828,030

ELEVATOR FOR USE WITH TOBACCO HARVESTER

Joseph J. Harrington, Lewiston, Adoniram J. Jilcott, Roxobel, John D. Mitchell, Woodville, Bertram L. Jordan, Lewiston, and Charles B. Stansfield, Woodville, N. C., assignors to Harrington Manufacturing Co., Inc., Lewiston, N. C., a corporation of North Carolina Application February 7, 1955, Serial No. 486,568

1 Claim. (Cl. 214—130)

This invention relates to the class of agricultural equipment and more particularly to a novel elevator for use with various types of tobacco harvesters.

The primary object of the present invention resides in the provision of an elevator adapted for use in combination with a tobacco harvester such as the tobacco harvester disclosed in the patent to Jim Brown Holliday, Patent No. 2,672,242, issued March 16, 1954, for Tobacco Harvester.

A further object of the invention resides in the provision of an elevator for use with a tobacco harvester that is adapted to carry racks in a detachable manner and wherein the racks may be lowered from a position in alignment with the upper platform of the tobacco harvester to a position overlying a truck and providing means whereby the rack may be automatically lifted off of the rack-supporting structure of the elevator.

An additional object of the invention lies in the provision of novel means for raising and lowering an elevator so as to always maintain a rack-supporting structure and the rack supported thereby substantially horizontal and wherein friction brake means including an overriding clutch is provided for maintaining a minimum of strain on the drive handle of a crank used for actuating the elevator.

An additional feature of the invention lies in the provision of automatic latching means for automatically holding the elevator in a raised position until it is desired to lower the elevator.

Still further objects and features of this invention reside in the provision of an elevator for use with a tobacco harvester that is simple in construction, capable of being readily associated with a tobacco harvester, capable of being inexpensively and speedily manufactured for wide use and distribution, and which is highly efficient in operation.

These, together with the various ancillary objects and features of the invention which will become subsequently apparent, reside in the details of construction and operation as more fully hereinafter described and claimed, reference being had to the accompanying drawings forming a part hereof, wherein like numerals refer to like parts throughout, and in which:

Figure 1 is a side elevational view of the elevator comprising the present invention shown operatively installed in conjunction with a tobacco harvester and further illustrating in phantom lines the elevator in a raised position;

Figure 2 is a plan view of the elevator and a portion of the tobacco harvester with the portion of the tobacco harvester having parts broken away for more clearly illustrating the invention;

Figure 3 is a rear elevational view of the elevator as installed on the tobacco harvester;

Figure 4 is a vertical sectional detail view as taken along the plane of line 4—4 in Figure 2 and illustrating, in particular, the construction of the shaft used for operating the elevator;

Figure 5 is a detail view illustrating the construction of one form of latch means;

Figure 6 is a plan view of a portion of the latch means;

Figure 7 is an enlarged sectional detail view illustrating the construction of the means for operating the shaft used for raising and lowering the elevator;

Figure 8 is an enlarged sectional detail view as taken along the plane of line 8—8 in Figure 7 and illustrating the construction of the pawl and ratchet forming part of the overriding clutch utilized in the invention;

Figure 9 is an elevational view of a modified form of latch means incorporating the invention; and Figure 10 is a plan view of the modified form of latch means.

With continuing reference to the accompanying drawings wherein like references designate similar parts throughout the various views and with initial attention directed to Figure 1, the reference numeral 10 is used to generally designate a tobacco harvester of the type disclosed in the patent to Jim Brown Holliday, Patent No. 2,672,242, issued March 16, 1954, for Tobacco Harvester. This tobacco harvester includes upwardly extending supports such as are indicated at 12 and 14, see Figure 3, which carry a platform 16 supported on a tubular framework 18. Affixed to the support members 12 and 14 are suitable ground-engaging wheels, as at 20 and 22, and associated with the support members 12 and 14 are a pair of matching plates for wheel coverings or pants 24 and 26, see Figure 2. The pants 24 and 26 are held outwardly of the support members 12 and 14 by suitable supporting members 28 and 30 and pivotally attached to these plates 24 and 26 are pairs of links, see Figure 1, as indicated at 32 and 34 for the plate 24. The pairs of links 32 and 34 and 36 and 38 are pivotally attached to legs 40 and 42 in any convenient manner, and the legs 40 and 42 have secured thereto suitable channel-shaped supporting arms 44 and 46 which are spaced apart from each other and which are adapted to carry racks 48. The racks 48 are provided with peripheral framework 50 and horizontally extending slats 52. Racks of other suitable configurations can be utilized.

Carried by the rack-supporting structure including the arm 44 is a suitable latch mechanism 54 which can be seen best in Figures 1, 5 and 6. This latch mechanism 54 includes a mounting plate 56 having lugs 58 and 60 struck therefrom which carry a shaft 62 on which a latch element 64 is rotatably mounted. A spring 66 is provided for continuously urging the latch element 64 into engagement with a detent 68 carried by the harvester 10. Hence, when the elevator is in a raised position the latch element 64 engages the detent 68 to lockingly hold the elevator in a raised position until manually disengaged. Alternatively, there may be pivotally attached, as is shown in Figure 9 as at 70, a latch element 72 which is adapted to engage a pin 74 or like structure carried by the rack-supporting member 44. A manually depressible handle 76 may be provided for the latch element 72 so as to disengage the latch element 72 when it is desired to lower the elevator.

Mounted within a horizontal tubular portion of the framework 18 is a shaft 80 having drums 82 and 84 mounted thereon about which cables 86 and 88 are wound, the cables being attached to eyes 90 and 92, see Figure 2, attached to the legs 40 and 42. The shaft 80 extends through suitable bearings as at 94, 96, 98 and 100 and has a gear 102 keyed thereto as at 104, as can be best seen in Figure 7. The gear 102 is also mounted within a housing 106 pinned as at 108 and otherwise secured by fasteners 110 to the harvester 10. The housing 106 also has mounted therein a worm 112 on a drive shaft 114 which extends downwardly and outwardly of the housing, The worm 112 and gear 102 serve as a reduction gear assembly.

Mounted on the shaft 114 just below the casing 106 is a disk plate 116 which is fixed to the shaft 114. Anothr disk plate 118 is provided with teeth 120, see Figure 8, and is free to turn on the shaft 114. A fiber friction disk 122 is positioned between the disk plate 116 and the toothed disk plate 118. A bearing assembly 124 is positioned immediately below the toothed disk plate 118 and a spring 126 yieldingly engages the bearing assembly 124, thus urging the disk plate 118 into engagement with the fiber disk 122 which frictionally engages the disk plate 118. Adjustable jamb nuts 130 are received on the threadsd end 132 of the drive shaft 114 and there is secured to the end 132 of the drive shaft 114 a suitable crank 134 for rotation thereof.

Also mounted on a suitable bracket 136 carried by the housing 116 and held in place against vertical movement by collars 138 and 140 held in place by setscrews 142 and 144 is a pawl shaft 146 which carries a pawl 148. A spring urged mechanism 149 of any convenient construction is provided for continuously urging the pawl 148 into engagement with teeth 120. When raising the elevator, the pawl 148 rides over the teeth 120 on the disk 118 allowing the elevator to be raised quite easily, but when lowering heavy loads, the pawl 148 locks the disk 118 causing friction between the disks 116 and 118 and the fiber friction disk 122, allowing the load to be lowered with minimum strain on the crank 134.

The operation of the elevator is believed to be obvious. The elevator is raised and lowered due to rotation of the shaft 80 by operation of the crank 34. This causes the drums 82 and 84 to be rotated, thus unwinding and winding the cables 86 and 88.

The tobacco is looped on sticks and with the elevator in a raised position, the sticks are laid across the detachable pallet or rack 48. Then, when the pallet is loaded a truck or trailer is backed under the elevator to be unloaded. The safety catch of the latching mechanism 54 is then tripped and the elevator is lowered using the drive crank 134. When the pallet rests on the body of the truck, the elevator is lowered a slight bit more to clear the pallet and then the truck may be driven away with the elevator empty and the pallet with the load of tobacco thereon on the truck. The parallelogram linkage including the arms 32, 34, 36 and 38 serve to always maintain the pallet or rack 48 in a horizontal position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claim.

What is claimed as new is as follows:

In combination with a vehicle having an elevated horizontal platform with upwardly extending support members, said elevator forming an extension of said platform when said platform is in a raised position, said elevator comprising a pair of transversely spaced rack supporting arms, vertically extending legs secured to the intermediate portions of said rack supporting arms, said legs terminating at their lower ends in ground engaging bases, parallel links pivotally connected to said legs and said upwardly extending support members for retaining said rack supporting arms in a horizontal plane at all times, an article supporting rack detachably carried by said rack supporting arms in overlying relation thereto, means carried by said platform and connected to said legs for selectively elevating said elevator from a position whereby said bases engage the ground to a position where said rack forms an extension of said platform, and cooperating latch means on said rack supporting arms and said platform, said latch means including an upstanding keeper carried by said platform adjacent each corner thereof disposed adjacent said elevator, a guide carried by each of said rack supporting arms and guidingly engageable with said keeper to align said rack with said platform, and pivotally mounted latch members carried by said guides and engageable with said keepers to lock said elevator in its position where said rack is aligned with said platform.

References Cited in the file of this patent

UNITED STATES PATENTS

| 2,298,166 | Richards | Oct. 6, 1942 |
| 2,503,146 | Anketell | Apr. 4, 1950 |
| 2,527,818 | Ives | Oct. 31, 1950 |
| 2,680,529 | Narvestad et al. | June 8, 1954 |

FOREIGN PATENTS

| 275,662 | Switzerland | Sept. 1, 1951 |
| 818,568 | Germany | Oct. 25, 1951 |
| 875,766 | Germany | May 7, 1953 |